July 3, 1962    G. A. LYON    3,042,453
WHEEL COVER
Filed Feb. 13, 1959
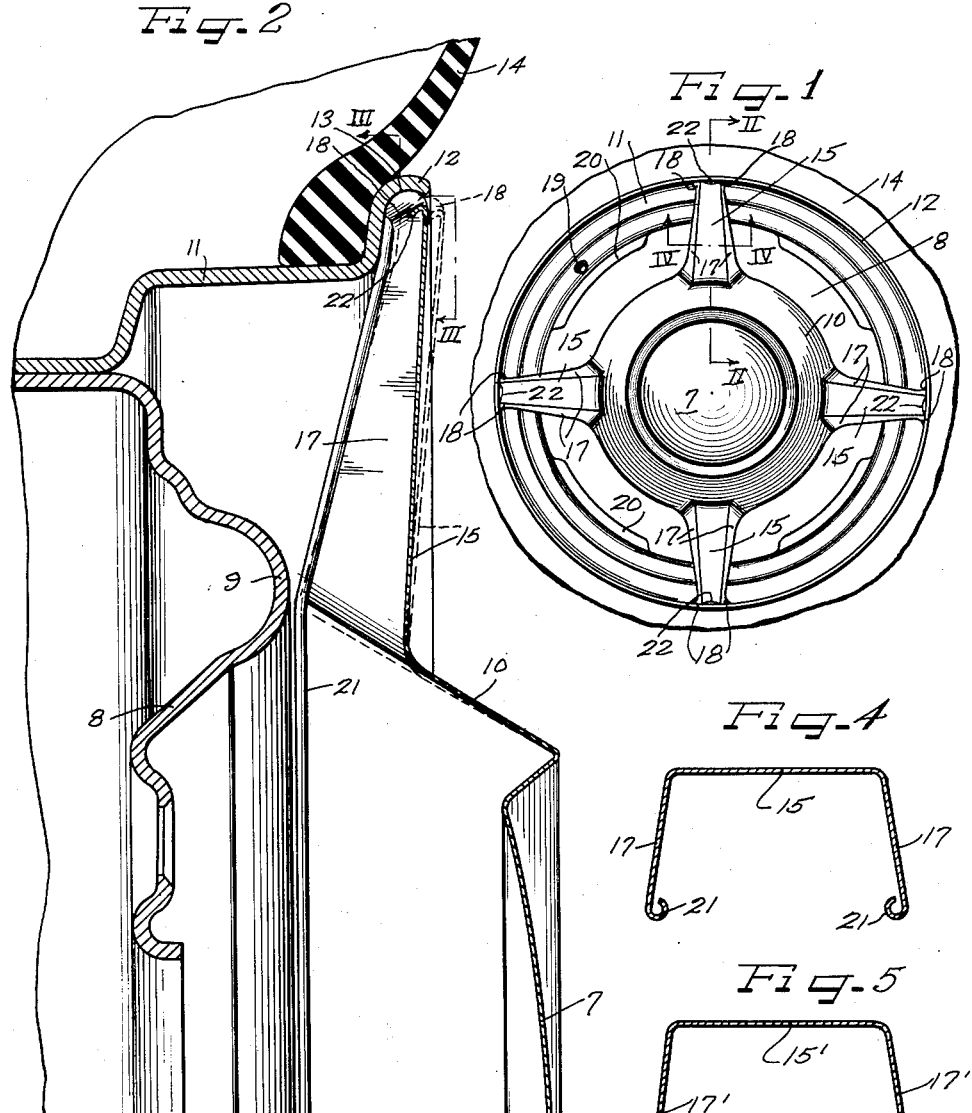
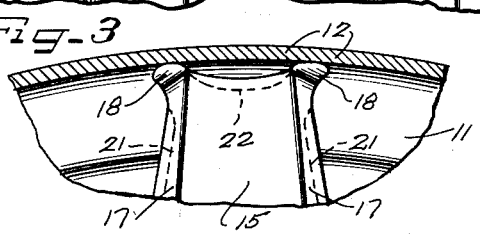
Inventor
George Albert Lyon

United States Patent Office 3,042,453
Patented July 3, 1962

3,042,453
WHEEL COVER
George Albert Lyon, Detroit, Mich., assignor to Lyon Incorporated, Detroit, Mich., a corporation of Delaware
Filed Feb. 13, 1959, Ser. No. 793,006
2 Claims. (Cl. 301—37)

The present invention relates to improvements in wheel structures and more particularly concerns the ornamental and protective covering of the outer sides of vehicle wheels.

An important object of the present invention is to provide an improved wheel structure having novel means for retaining a cover on the wheel and providing an unusual ornamental effect.

Another object of the invention is to provide a wheel structure including a generally hub cap type of cover having novel spoke arm retaining means.

A further object of the invention is to provide a cover having novel radially projecting retaining arms engageable with the terminal flange of the tire rim of a vehicle wheel.

Still another object of the invention is to provide an improved press-on, pry-off retaining means for wheel covers.

Other objects, features and advantages of the present invention will be readily apparent from the following detailed description of certain preferred embodiments thereof taken in conjunction with the accompanying drawing, in which:

FIGURE 1 is an outer side elevational view of a wheel structure embodying features of the invention;

FIGURE 2 is an enlarged radial sectional detail view taken substantially on the line II—II of FIGURE 1;

FIGURE 3 is a fragmentary sectional elevational detail view taken substantially on the line III—III of FIGURE 2;

FIGURE 4 is an enlarged fragmentary sectional detail view taken substantially on the line IV—IV of FIGURE 1; and FIGURE 5 is a view similar to FIGURE 4 but showing a slight modification.

In the exemplary form of the invention shown in FIGURES 1–4, a hub cap type of wheel cover 7 is constructed and arranged to be applied over the central portion of a wheel body 8 of the disk spider type having an intermediate annular axially outwardly projecting nose bulge 9 toward which an annular generally axially inwardly and radially outwardly sloping side wall 10 of the wheel cover member is adapted to project. Peripherally the spider body 8 is attached in supporting relation to a multi-flange, drop center tire rim 11 including a generally radially outwardly and then axially outwardly extending terminal flange 12 defining in the axially outwardly extending portion thereof a generally radially inwardly opening groove 13. A pneumatic tire 14 which may be of the tubeless type is adapted to be supported by the tire rim.

Any suitable metallic sheet or strip may be utilized in making the cover 7, such as stainless steel, brass and the like adapted for mass production methods of manufacture such as die press drawing, and suitable finishing as by polishing, plating, painting and the like. The material should be susceptible of cold work hardening to substantial resilience.

For retaining the cover member 7 over the outer side of the wheel in press-on, pry-off relation, it is provided with a plurality such as four equidistantly circumferentially spaced, radially projecting spoke-like arms 15 projecting to a diameter to be retainingly engageable with the terminal flange 12. To this end, the spoke arms 15 are constructed as integral one-piece radial extensions from the side wall 10 of the cover member and are of generally U-shape with the main or top or crown wall merging with the cover side wall 10 spaced from the terminal edge of the cover side wall and with side wall panel portions 17 of the respective spoke arms merging with those portions of the cover side wall 10 between the spoke arms to the terminal edge of the cover side wall.

Means are provided whereby the spoke arms 15 serve as retainers for the cover member 7 relative to the wheel. For this purpose, the spoke arms extend to a terminal diameter such as to be engageable retainingly within the groove 13 of the terminal flange 12, the side walls 17 of the arms being provided with respective resiliently flexible retaining flange extension terminals 18 having edges generally complementary to the groove cross-section. Each of the retaining terminal flange portions 18 is turned to face and flare generally circumferentially away from the respective arm 15 and thus generally divergently relative to the terminal flange 18 of the companion arm side wall 17. It will be observed in FIGURES 1–3 that the retaining terminal flange portions 18 extend slightly radially outwardly beyond the terminus of the crown wall of the associated arm 15. Thereby the terminals 18 are resiliently flexible circumferentially relative to the crown wall.

Normally the retaining terminal flange portions 18 of the arms project at their edges to a slightly greater diameter than the diameter within the terminal flange groove 13. Hence, engagement of the terminals 18 within the groove 13 is under resilient tensioned thrust. Since the terminal portions 18 project in respective circumferentially opposite directions in each pair and the edges of the terminals bite into the surface defining the terminal flange groove 13, effective retention against turning of the cover member 7 on the wheel is afforded. Thereby, desired orientation of the arms 15 relative to a valve stem 19 and wheel openings 20 can be maintained.

In applying the cover member 7 to the outer side of the wheel, two of the arms 15 can be disposed by a canted relative assembly movement of the cover member and the wheel into retaining engagement of the terminals 18 of such arms within the terminal flange groove 13. Then, by pressing axially inwardly on the cover member 7, or on the remaining ones of the arms 15, such remaining arms are caused to snap into retaining engagement within the terminal flange groove 13 and behind the shoulder that defines the axially outer side of the groove at the tip of the terminal flange lip. During the press-on action, the arms 15 and the portions of the cover side wall 10 with which they merge resiliently flex substantially as indicated in dash outline in FIGURE 2 in order to enable contraction of the terminals 18 to a small enough diameter to pass the terminal flange lip shoulder. In such flexing of the arms and contiguous portions of the cover wall 10, the opposed pairs of side walls 17 of the arms are adapted to flex resiliently slightly toward one another as the contiguous portions of the cover side wall 10 flex slightly radially inwardly. Then, after the terminals 18 snap into the groove 13 of the tire rim, the resiliently flexed cover side wall 10 and the arm side wall 17 return substantially to their original or initial positions but tensionably thrusting the terminals 18 firmly into retaining engagement within the rim groove 13.

Resilient stiffness is imparted to the cover side wall 10 and the arm side wall 17 by a reinforcing and finishing turned bead 21 which as shown in FIGURES 2 and 4 may be turned under in concealed relation or may be turned out to provide the bead 21' as shown in FIGURE 5, the other elements of the cover and arms being the same. The bead 21 extends continuously along the terminus of the side wall 10 and each side wall 17 of each arm except for the terminal end of each arm where the bead stops short of the respective retaining terminal flanges 18 and there is a gap in the bead 21 between the respective sets of retaining terminals 18.

In the fully assembled relationship of the cover 7 on the wheel, the terminal ends of the turned reinforcing bead 21 bottom against the radially extending portion of the terminal flange 12 and thus may support the terminus of the cover side wall 10 in slightly spaced relation to the nose bulge 9 of the wheel body, although the side wall terminus may bottom against the nose bulge if preferred.

Since the retaining spoke arms 15 through the retaining terminals 18 thereof maintain an exceedingly firm and highly displacement resistant grip within the terminal flange groove 13, means are provided to facilitate removal of the cover member 7 when desired in order to gain access to the central portion of the wheel which is protectively covered by the cover member 7. For this purpose, the terminal end portion of the crown wall of at least one of the spoke arms 15 and preferably of each of the spoke arms is provided with an underturned reinforced pry-off shoulder tip flange 22 affording in the assembly with the wheel a slight gap with the terminal flange lip tip shoulder as best seen in FIGURE 2 into which a pry-off tool tip can be inserted and pry-off leverage exerted to reverse the action that occurred during press-on, namely to flex the engaged spoke arm generally radially inwardly and axially outwardly into substantially the position shown in dash outline in FIGURE 2 until the retaining terminals 18 snap axially outwardly free from the terminal flange lip shoulder. In the four arm arrangement shown, such pry-off of two of the arms 15 adjacent to one another will effect removal of the cover. The turned reinforcing pry-off shoulder terminal portion 22 also serves as a stiffening strut between the companion retaining terminals 18.

It will be understood that modifications and variations may be effected without departing from the scope of the novel concepts of the present invention.

I claim as my invention:

1. In a wheel structure including a wheel body and a multi-flange tire rim supported by the wheel body and having a generally radially inwardly facing terminal flange provided with a radially inwardly opening groove, a cover member having a crown portion dimensioned to overlie the wheel body and provided with a generally radially outwardly facing side wall from which project a plurality of generally radially outwardly extending cover retaining arms of generally U-shaped cross-section and substantially rigid in their lengthwise direction, said arms being substantially spaced apart uniformly circumferentially and with substantial circumferential areas of the side wall of the cover member intervening therebetween, said side wall areas being resiliently flexible radially, said arms having retaining terminals on their radially outer ends comprising a spaced pair of generally circumferentially facing retaining terminal flanges having edges projecting generally radially outwardly and which normally project to a slightly greater diameter than said tire rim flange, said arms being deflected radially inwardly by the engagement of said terminals retainingly with said rim flange groove and said cover member flexible intervening wall portions being resiliently flexed radially as a result of said radially inward deflection of the arms and tensionably thrusting said arms toward said rim flange and thus said terminals firmly into retaining engagement with the rim flange.

2. In a cover member for disposition over the outer side of a vehicle wheel structure including a wheel body and a multi-flange tire rim supported by the wheel body and having a radially inwardly facing terminal flange provided with a radially inwardly opening groove, a crown portion having a generally radially outwardly facing side wall of substantially smaller diameter than said rim flange and provided with a plurality of radially outwardly projecting cover-retaining arms of generally U-shaped cross-section and substantially rigidity in their lengthwise direction, said arms having on their radially outer ends terminals comprising a spaced pair of generally circumferentially facing retaining terminal flanges having edges projecting generally radially outwardly for retaining engagement with the rim flange groove, said arms being substantially spaced apart circumferentially and with substantial circumferential areas of the crown side wall intervening therebetween, said areas being resiliently flexible in radial direction from thrusting deflection of said arms in their length radially inwardly from a slightly larger diameter of the arm terminals to the diameter of said rim flange on being placed in retaining engagement with said rim flange.

References Cited in the file of this patent

UNITED STATES PATENTS

| D. 93,769 | Horn | Nov. 6, 1934 |
| 2,123,025 | Ramirez | July 5, 1938 |
| 2,584,452 | Horn | Feb. 5, 1952 |
| 2,683,631 | Lyon | July 13, 1954 |
| 2,690,357 | Lyon | Sept. 28, 1954 |
| 2,737,421 | Lyon | Mar. 6, 1956 |
| 2,760,606 | Lyon | Aug. 28, 1956 |
| 2,760,828 | Lyon | Aug. 28, 1956 |
| 2,790,682 | Lyon | Apr. 30, 1957 |

FOREIGN PATENTS

| 524,139 | Canada | Apr. 24, 1956 |
| 532,574 | Canada | Nov. 6, 1956 |
| 540,779 | Canada | May 14, 1957 |